(12) United States Patent
Ewert

(10) Patent No.: US 12,061,269 B2
(45) Date of Patent: Aug. 13, 2024

(54) METHOD FOR OPERATING A GNSS SENSOR OF A VEHICLE

(71) Applicant: Robert Bosch GmbH, Stuttgart (DE)

(72) Inventor: Marlon Ramon Ewert, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/766,808

(22) PCT Filed: Dec. 6, 2018

(86) PCT No.: PCT/EP2018/083846
§ 371 (c)(1),
(2) Date: May 26, 2020

(87) PCT Pub. No.: WO2019/115357
PCT Pub. Date: Jun. 20, 2019

(65) Prior Publication Data
US 2021/0018631 A1  Jan. 21, 2021

(30) Foreign Application Priority Data

Dec. 11, 2017 (DE) .................. 10 2017 222 356.1

(51) Int. Cl.
*G01S 19/20* (2010.01)
*G01S 19/33* (2010.01)
*G01S 19/42* (2010.01)

(52) U.S. Cl.
CPC .............. *G01S 19/20* (2013.01); *G01S 19/33* (2013.01); *G01S 19/421* (2013.01); *G01S 19/426* (2013.01)

(58) Field of Classification Search
CPC .......... G01S 19/20; G01S 19/21; G01S 19/23; G01S 19/33; G01S 19/36; G01S 19/37;
(Continued)

(56) References Cited

U.S. PATENT DOCUMENTS 6,480,788 B2 * 11/2002 Kilfeather ............... G01S 19/40
  701/485
7,286,592 B2 * 10/2007 Pietila ..................... G01S 19/30
  375/147
(Continued)

FOREIGN PATENT DOCUMENTS

CN  104678415 A  6/2015
CN  104808682 A * 7/2015 ............. G05D 1/102
(Continued)

OTHER PUBLICATIONS

International Search Report corresponding to PCT Application No. PCT/EP2018/083846, mailed Mar. 25, 2019 (German and English language document) (8 pages).
(Continued)

*Primary Examiner* — Vladimir Magloire
*Assistant Examiner* — Michael W Justice
(74) *Attorney, Agent, or Firm* — Maginot, Moore & Beck LLP

(57) ABSTRACT

A method for operating a GNSS sensor of a vehicle having control operations influenceable via an electronic control unit includes receiving satellite data, evaluating the satellite data, and deactivating at least one operating mode of the GNSS sensor when at least a portion of the satellite data is unsuitable for determining the position of the vehicle.

12 Claims, 3 Drawing Sheets

(58) Field of Classification Search
CPC ...... G01S 19/48; G01S 19/425; G01S 19/421; G05D 1/0055
USPC .................. 342/357.58, 357.42; 701/23
See application file for complete search history.

(56) References Cited

U.S. PATENT DOCUMENTS

| | | | | |
|---|---|---|---|---|
| 7,642,958 B2* | 1/2010 | Bernhardt | ............... | G01S 19/34 342/357.31 |
| 8,169,366 B2* | 5/2012 | Conroy | ................... | G01S 19/33 342/357.63 |
| 8,412,093 B2* | 4/2013 | Liu | ................... | G01S 19/33 375/147 |
| 8,566,033 B2* | 10/2013 | Clemenceau | ........... | G01S 19/48 701/472 |
| 8,610,624 B2* | 12/2013 | Savoy | ................... | G01S 19/20 342/357.58 |
| 8,688,375 B2* | 4/2014 | Funk | ................... | G01S 19/49 340/995.19 |
| 8,706,414 B2* | 4/2014 | Funk | ................... | G01S 19/49 340/995.19 |
| 8,761,133 B2* | 6/2014 | Wirola | ................... | G01S 19/25 455/456.1 |
| 8,773,309 B2* | 7/2014 | Kawaguchi | ............. | G01S 19/46 342/357.71 |
| 9,244,172 B2* | 1/2016 | O'Connor | ............... | G01S 19/05 |
| 9,690,292 B1* | 6/2017 | Chan | ................... | G06T 7/004 |
| 9,885,788 B2* | 2/2018 | Skalicky | ................. | G01S 19/20 |
| 9,964,949 B2* | 5/2018 | Hay | ................... | B60W 50/00 |
| 9,983,009 B2* | 5/2018 | Roger | ................... | G01C 23/00 |
| 9,989,647 B2* | 6/2018 | Kim | ................... | G01S 19/32 |
| 10,215,862 B2* | 2/2019 | Syrstad | ................... | G01S 19/08 |
| 10,416,315 B2* | 9/2019 | Skalicky | ................. | G01S 19/20 |
| 10,495,761 B2* | 12/2019 | Skalicky | ................. | G01S 19/20 |
| 10,527,434 B2* | 1/2020 | Izumi | ................... | G05D 1/0278 |
| 10,571,578 B2* | 2/2020 | Sun | ................... | G01S 19/46 |
| 10,613,233 B2* | 4/2020 | Skalicky | ................. | G01S 19/421 |
| 10,757,594 B2* | 8/2020 | Takahashi | ................. | G01S 19/21 |
| 2002/0072853 A1* | 6/2002 | Sullivan | ................... | G01S 5/14 701/485 |
| 2005/0185700 A1* | 8/2005 | Pietila | ................... | G01S 19/33 375/147 |
| 2006/0284765 A1* | 12/2006 | Bernhardt | ................. | G01S 19/34 455/456.6 |
| 2008/0077326 A1* | 3/2008 | Funk | ................... | G01C 21/1654 701/500 |
| 2009/0181695 A1* | 7/2009 | Wirola | ................... | G01S 19/25 342/357.74 |
| 2010/0099351 A1* | 4/2010 | Liu | ................... | G01S 19/36 455/3.02 |
| 2010/0127925 A1* | 5/2010 | Conroy | ................... | G01S 19/33 342/357.63 |
| 2011/0181465 A1* | 7/2011 | Li | ................... | G01S 19/33 342/357.73 |
| 2011/0260915 A1* | 10/2011 | Kawaguchi | ............. | G01S 19/46 342/357.29 |
| 2013/0009817 A1* | 1/2013 | Savoy | ................... | G01S 19/20 342/357.58 |
| 2013/0030775 A1* | 1/2013 | Clemenceau | ........... | G01S 19/23 703/2 |
| 2013/0162468 A1* | 6/2013 | Kim | ................... | G01S 19/425 342/357.25 |
| 2013/0166198 A1* | 6/2013 | Funk | ................... | G01S 19/49 701/446 |
| 2013/0342396 A1* | 12/2013 | O'Connor | ............... | G01S 19/05 342/357.42 |
| 2015/0285916 A1* | 10/2015 | Syrstad | ................... | G01S 19/08 342/357.4 |
| 2016/0109551 A1* | 4/2016 | Faragher | ............... | G05D 1/0278 701/23 |
| 2016/0274242 A1* | 9/2016 | Skalicky | ................. | G01S 19/20 |
| 2016/0345193 A1* | 11/2016 | Takahashi | ........... | H04W 72/1284 |
| 2017/0102700 A1* | 4/2017 | Kozak | ................. | G05D 1/0061 |
| 2017/0139052 A1* | 5/2017 | Skalicky | ................. | G01S 19/28 |
| 2017/0176989 A1* | 6/2017 | Hay | ................... | G05D 1/0278 |
| 2017/0219716 A1* | 8/2017 | Niesen | ................. | G01S 19/426 |
| 2017/0276801 A1 | 9/2017 | Schilling et al. | | |
| 2017/0307385 A1* | 10/2017 | Izumi | ................... | G05D 1/0278 |
| 2018/0010916 A1* | 1/2018 | Roger | ................... | G01S 19/48 |
| 2018/0081064 A1* | 3/2018 | Skalicky | ................. | G01S 19/20 |
| 2018/0259648 A1* | 9/2018 | Skalicky | ................. | G01S 19/20 |
| 2018/0275284 A1* | 9/2018 | Sun | ................... | G01S 5/0236 |
| 2018/0373243 A1* | 12/2018 | Russell | ................. | G05D 1/0088 |

FOREIGN PATENT DOCUMENTS

| | | |
|---|---|---|
| CN | 105807301 A | 7/2016 |
| DE | 10 2016 124 278 A1 | 6/2017 |
| JP | 2010-530958 A | 9/2010 |
| JP | 2011-223548 A | 11/2011 |
| JP | 2014-173891 A | 9/2014 |

OTHER PUBLICATIONS

Wörner, M. et al., "Integrity for Autonomous Driving: A Survey," 2016 IEEE/ION Position, Location and Navigation Symposium (PLANS), IEEE, 2016, 666-671 (6 pages).

* cited by examiner

METHOD FOR OPERATING A GNSS SENSOR OF A VEHICLE

This application is a 35 U.S.C. § 371 National Stage Application of PCT/EP2018/083846, filed on Dec. 6, 2018, which claims the benefit of priority to Serial No. DE 10 2017 222 356.1, filed on Dec. 11, 2017 in Germany, the disclosures of which are incorporated herein by reference in their entirety .

The present disclosure relates to a method for operating a GNSS sensor of a vehicle of which the control operations are influenceable via an electronic control unit, a method for operating a vehicle of which the control operations are influenceable via an electronic control unit, a GNSS sensor, and a vehicle comprising a GNSS sensor. The subject matter of the present disclosure is also a correspondingly configured computer program.

BACKGROUND

An autonomous vehicle is a vehicle which functions without a driver. The vehicle travels autonomously by independently detecting, for example, the course of the road, other road users, or obstacles, and calculating the corresponding control commands in the vehicle, and routing them to the actuators in the vehicle, whereby the trajectory of the vehicle is correctly influenced. In the case of a fully autonomous vehicle, the driver is not involved in the driving process.

Currently available vehicles are not yet capable of acting autonomously. On the one hand, this is because the corresponding technology is not yet fully mature. On the other hand, this is because it is currently still prescribed by law that the vehicle driver must be able to maintain control of the driving process at all times. This impedes the implementation of autonomous vehicles. However, various manufacturers are already providing systems which feature autonomous or semi-autonomous driving. These systems are in the intensive test phase. It is currently conceivable that in a few years, fully autonomous vehicle systems will come onto the market once the aforementioned barriers have been removed.

For autonomous operation, a vehicle requires, inter alia, a sensor system which is capable of ascertaining a highly accurate vehicle position, in particular with the aid of navigation satellite data (GPS, GLONASS, Beidou, Galileo). In this case, the sensor system can also use correction data from so-called correction services in order to calculate the position of the vehicle even more accurately.

SUMMARY.

Here, according to the disclosure, a method is proposed for operating a GNSS sensor of a vehicle, of which the control operations are influenceable via an electronic control unit, comprising at least the following steps:
  a) receiving satellite data,
  b) evaluating the satellite data,
  c) deactivating a least one operating mode of the GNSS sensor if at least a portion of the satellite data is unsuitable for determining the position of the vehicle.

GNSS stands for Global Navigation Satellite System. GNSS is a system for terrestrial and/or aerial position determination and/or navigation by means of receiving the signals from navigation satellites, referred to here as satellite data. Thus, GNSS is a collective term for the use of existing and future global satellite systems such as GPS (NAVSTRAR GPS), GLONASS, Beidou, and Galileo. The GNSS sensor is thus a sensor system which is suitable for receiving and processing, for example, evaluating, navigation satellite data. Preferably, the GNSS sensor is capable of ascertaining a highly accurate vehicle position with the aid of navigation satellite data (GPS, GLONASS, Beidou, Galileo).

The vehicle of which the control operations are influenceable via an electronic control unit is preferably an autonomous vehicle. Particularly preferably, the vehicle is an autonomous automobile.

The GNSS sensor can be operated in various operating modes. Preferably, the GNSS sensor can be operated in a GPS mode, GLONASS mode, Beidou mode, and/or Galileo mode. In this case, for example, operation in the GPS mode means that in particular only the GPS signal is evaluated.

In other words, the approach proposed here describes in particular a method for (partially) deactivating a GNSS sensor in an (autonomous) vehicle. An (at least partial) deactivation of the GNSS sensor is, for example, expedient if satellite data are highly corrupted. This may be the case, for example, during a severe solar storm or under extreme weather conditions. Within the scope of the proposed approach, an (at least partial) deactivation of a GNSS sensor in a vehicle may take place (either) directly or indirectly.

According to an advantageous embodiment, it is proposed that the at least one operating mode of the GNSS sensor is deactivated if the GNSS sensor gathers the information from the satellite data that said data are faulty or corrupted. This may be referred to as a direct deactivation. For this purpose, additional data may be encoded into the satellite data, so that in particular during the evaluation in step b), it can be detected, preferably by means of the GNSS sensor, that these satellite data are unusable. In this case, the GNSS sensor or at least one operating mode of the GNSS sensor can deactivate itself or can be deactivated with respect to the output data, until valid GNSS data are again received from the satellites. In this case, the input signals of the satellite data can be processed as usual. However, in the case of invalid satellite data, the GNSS sensor is preferably immediately deactivated. This provides the advantage that autonomous vehicles may be removed from operation, for example, with respect to the GNSS sensor, if the satellite data of an area are severely corrupted, for example, due to a solar storm or due to extreme weather conditions. As a result, it is possible to forestall serious position inaccuracies in the automated driving from the outset, thus making it possible to avoid severe accidents.

According to an advantageous embodiment, it is proposed that the at least one operating mode of the GNSS sensor is deactivated if the information is supplied to the GNSS sensor via a communication link that the satellite data are faulty or corrupted. This may be referred to as an indirect deactivation. For this purpose, status data can be received about the GNSS system for the area in which the vehicle is located, for example, via a car-to-X communication link installed in the vehicle or via a correction service. In the case of (too severely) corrupted satellite data, the GNSS sensor may thus be deactivated externally, in particular by means of a special error code, preferably for a certain period. Preferably, the GNSS sensor of an (autonomous) vehicle is specifically deactivated externally if the quality of satellite data falls below a certain value.

According to an advantageous embodiment, it is proposed that the at least one operating mode of the GNSS sensor is deactivated if the vehicle is located in a certain (spatial) area. In other words, this means in particular that the (partial)

deactivation of the GNSS sensor may be area-dependent or location-dependent. A certain area is preferably an area for which insufficient satellite coverage is forecast. Alternatively or cumulatively, the certain area may be an area for which it is already known that the satellite data which arrive there are faulty or corrupted.

Furthermore, a certain area may be an urban area. Satellite reception is frequently very poor in cities. This phenomenon, which can be observed in particular in street canyons, is also referred to in the field of GNSS systems as the "urban canyon" problem. Preferably, a targeted (partial) deactivation of a GNSS sensor takes place externally if the vehicle travels into an urban area. As a result, it may be achieved that an autonomous vehicle is forced to find its position in this area in an alternative manner, or is only manually controllable in this area. This is advantageous, since the performance of the GNSS sensor in this area is frequently not sufficient for an autonomous driving function. Conversely, it may thereby be achieved that a GNSS sensor is used only if it is ensured that the quality of the received satellite data is also sufficient for autonomous driving.

Further preferably, the at least one operating mode of the GNSS sensor is deactivated for a certain period, for example, the duration of a solar storm. Particularly preferably, the certain period is area-dependent or location-dependent.

According to an advantageous embodiment, it is proposed that the deactivation of the at least one operating mode of the GNSS sensor is reported to a superordinate system. In this case, it is particularly preferable if the at least one operating mode of the GNSS sensor is reactivated if the superordinate system triggers an activation signal. The superordinate system may be a GNSS management system and/or a so-called cloud.

Preferably, the GNSS sensor informs an infrastructure or cloud, preferably via a car-to-X communication link, along with a vehicle ID, that it has been (partially) deactivated if a deactivation takes place in step c). In this case, the GNSS sensor may furthermore transmit its last valid position and/or time of day and/or the reason for the deactivation (for example, code in satellite data or an external command). Preferably, the cloud checks whether the (partial) deactivation of the GNSS sensor was or is legitimate. The deactivation is legitimate in particular if a reason (for example, code in satellite data or an external command) exists for the deactivation. Particularly preferably, the cloud subsequently transmits a (corresponding) response to the GNSS sensor preferably via car-to-X. In this case, it may be provided that the GNSS sensor remains in the (partially) deactivated state if or as long as the deactivation is legitimate. However, if the deactivation is not (or is no longer) legitimate, the GNSS sensor may in particular be re-activated from the cloud. If there was no reason for the deactivation of the GNSS sensor, this may be an indication of an internal GNSS sensor error, or it could be that the GNSS sensor was corrupted by a signal jammer. This information may be correspondingly processed by the cloud.

According to an advantageous embodiment, it is proposed that (only) the operating mode of the GNSS sensor is deactivated which is associated with a particular satellite system. The particular satellite system is preferably a satellite system for which signal corruption exists or has been detected. For example, (only) the GPS mode of the GNSS sensor is deactivated if (only) the GPS signal is faulty or corrupted. In other words, it is preferred if (depending on the situation) only certain portions of the GNSS sensor are deactivated. In the case of corrupted GPS data, it may, for example, be expedient to deactivate only the GPS paths in the GNSS sensor (temporarily), while the other satellite signals, for example, GLONASS or Galileo or Beidou, continue to be evaluated by the GNSS sensor.

According to another aspect, a method is proposed for operating a vehicle. The vehicle is a vehicle of which the control operations are influenceable via an electronic control unit. The method comprises at least the following steps:

a) determining the position of the vehicle using a GNSS sensor which is operated according to a method for operating a GNSS sensor which is proposed here, b) limiting the influence of the electronic control unit to at least one of the control operations of the vehicle if at least one operating mode of the GNSS sensor has been deactivated.

Preferably, a limitation of the travel speed of the vehicle (which can be specified by the control unit) takes place in step b) if at least one operating mode of the GNSS sensor has been deactivated. Furthermore, an autonomous driving mode is preferably disabled in step b) if at least one operating mode of the GNSS sensor has been deactivated. The autonomous driving mode is disabled in particular if at least two or even all operating modes of the GNSS sensor have been deactivated. This is based on the idea that autonomous vehicles in which the GNSS receiver has been temporarily deactivated are to be operated only manually, or the autonomous driving mode is to be limited in any case to such an extent that, for example, a maximum speed cannot be exceeded.

According to another aspect, a GNSS sensor is proposed which is provided and designed for carrying out a method proposed here for operating a GNSS sensor.

According to another aspect, a vehicle is proposed which is equipped with a GNSS sensor which is proposed here. The vehicle is a vehicle of which the control operations are influenceable via an electronic control unit. Preferably, the vehicle is an autonomous vehicle, particularly preferably, an autonomous automobile.

A GNSS sensor may presently be understood to mean an electrical device which processes sensor signals and which outputs control and/or data signals as a function thereof. The sensor may comprise an interface which can be designed as hardware and/or software. In the case of a hardware-based design, the interface may, for example, be part of a so-called system ASIC (application-specific integrated circuit) which contains a variety of functions of the device. However, it is also possible that the interface comprises its own integrated circuits or is at least partially made up of discrete components. In a software-based design, the interfaces may be software modules which, for example, are present on a microcontroller, in addition to other software modules.

Also advantageous is a computer program product or a computer program containing programming code which can be stored on a machine-readable medium or a storage medium such as a semiconductor memory, a hard-disk memory, or an optical memory, and which is used for executing, implementing, and/or activating the steps of the method according to one of the above-described embodiments, in particular if the program product or program is executed on a computer or a device.

BRIEF DESCRIPTION OF THE DRAWINGS

The approach proposed here and its technical field will be described in greater detail below based on the figures. It should be noted that the present disclosure is not to be limited to the depicted exemplary embodiments. In particular, if it is not explicitly depicted otherwise, it is also possible to extrapolate sub-aspects of the facts described in the figures and to combine them with other components and/or findings from other figures and/or the present description. The following are schematically depicted.

DETAILED DESCRIPTION

Figure 1:
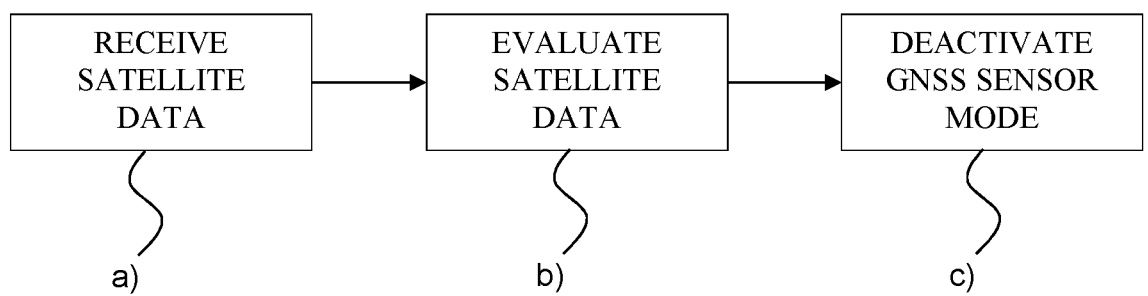
FIG. 1: an exemplary sequence of a method according to the present disclosure for operating a GNSS sensor.

FIG. 1 schematically depicts an exemplary sequence of a method according to the present disclosure for operating a GNSS sensor. First, in step a), satellite data are received. In step b), said data are evaluated. In step c), a deactivation takes place of at least one operating mode of the GNSS sensor if at least a portion of the satellite data is unsuitable for determining the position of the vehicle.

Figure 2:
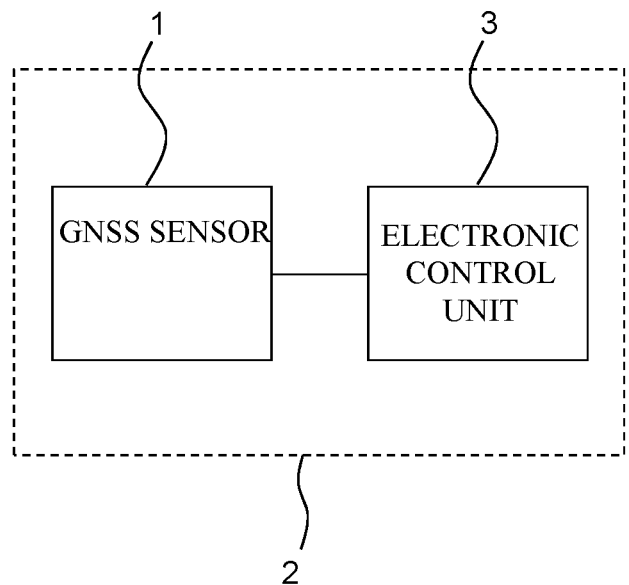
FIG. 2: a vehicle comprising a GNSS sensor.

FIG. 2 schematically depicts a vehicle 2 comprising a GNSS sensor 1 which is provided and configured for carrying out the method described in connection with FIG. 1. The vehicle 2 is a vehicle of which the control operations are influenceable via means of an electronic control unit 3, for example, an autonomously operating automobile. The GNSS sensor 1 is connected to the electronic control unit 3.

Figure 3:
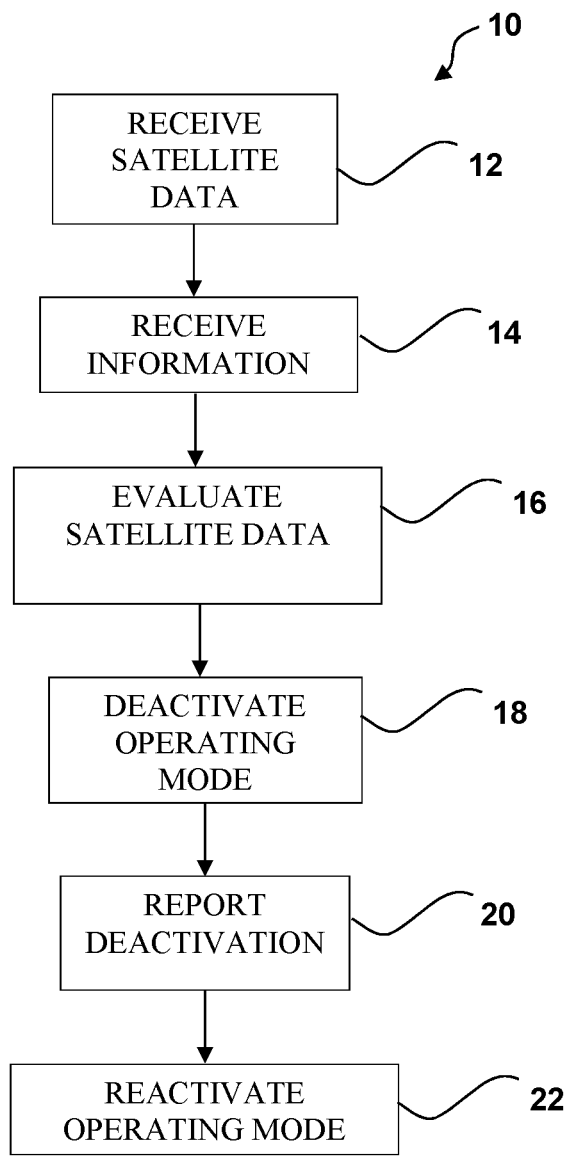
FIG. 3: an exemplary sequence of a method including external reporting according to the present disclosure.

According to the embodiment of FIG. 3 which shows method 10, satellite data is received by a GNSS receiver at block 12. Information is received, preferably by the GNSS receiver that indicates that the satellite data are faulty or corrupted at block 14. The satellite data are evaluated at block 16. During the evaluation it is determined that the satellite data are unusable using the information. Accordingly, at block 18 at least one operating mode of the GNSS sensor is deactivated. This provides the advantage that autonomous vehicles may be removed from operation, for example, with respect to the 5 GNSS sensor, if the satellite data of an area are severely corrupted or forecast to provide insufficient coverage, for example, due to a solar storm or due to extreme weather conditions. The deactivation of the at least one operating mode of the GNSS sensor is reported to a superordinate system at block 20. At block 22 the GNSS sensor is reactivated when the superordinate system triggers an activation signal.

Figure 4:
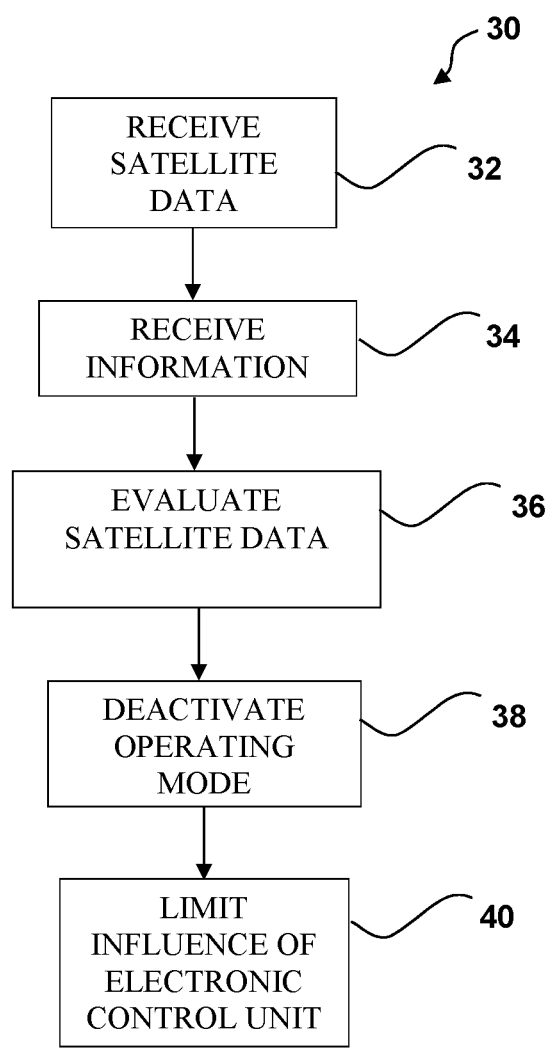
FIG. 4: an exemplary sequence of a method including limiting influence of an electronic control unit according to the present disclosure.

According to the embodiment of FIG. 4 which shows method 30, satellite data is received by a GNSS receiver at block 32. Information is received, preferably by the GNSS receiver that indicates that the satellite data are faulty or corrupted at block 34. The satellite data are evaluated at block 36. During the evaluation it is determined that the satellite data are unusable using the information. Accordingly, at block 38 at least one operating mode of the GNSS sensor is deactivated. At block 40, the influence of the electronic control unit to at least one of the control operations of the vehicle is limited once at least one operating mode of the GNSS sensor has been deactivated.

The approach proposed here contributes in particular to preventing severe and dangerous position errors in autonomous vehicles, thus making it possible to increase the safety of autonomous vehicles.

The invention claimed is:

1. A method for operating a GNSS sensor of a vehicle having control operations influenceable via an electronic control unit, wherein the GNSS sensor is configured to operate in a plurality of operating modes, each of the plurality of operating modes associated with a respective satellite system, the method comprising:
   receiving satellite data associated with a first of the respective satellite systems;
   evaluating the satellite data;
   deactivating a first operating mode of the plurality of operating modes associated with the first of the respective satellite systems when at least a portion of the satellite data is unsuitable for determining the position of the vehicle;
   reporting the deactivation of the first operating mode and geopositioning data externally to the vehicle to a superordinate system; and
   reactivating, with the superordinate system, the deactivated first operating mode using an activation signal.

2. The method as claimed in claim 1, wherein:
   the received satellite data includes information indicating that the satellite data are faulty or corrupted; and
   deactivating the first operating mode includes deactivating the first operating mode based on the information from the satellite data indicating that said data are faulty or corrupted.

3. The method as claimed in claim 1, further comprising:
   supplying information indicating that the satellite data are faulty or corrupted via a communication link, wherein deactivating the first operating mode includes deactivating the first operating mode based on the supplied information.

4. The method as claimed in claim 1, wherein:
   evaluating the satellite data includes evaluating the satellite data based upon an area in which the vehicle is located; and
   deactivating the first operating mode includes deactivating the first operating mode when the vehicle is located in a predetermined area.

5. The method as claimed in claim 1, further comprising:
   receiving further satellite data associated with a second of the respective satellite systems;
   evaluating the further satellite data; and
   deactivating a second operating mode of the plurality of operating modes associated with a second of the respective satellite systems when at least a portion of the further satellite data is unsuitable for determining the position of the vehicle of the GNSS sensor while the first operating mode is deactivated.

6. The method of claim 1, wherein the electronic control unit controls least one of the receiving, the evaluating, and the deactivating.

7. A method for operating a vehicle having control operations influenceable via an electronic control unit, comprising:
   determining a position of the vehicle using a GNSS sensor, wherein the GNSS sensor is configured to operate in a plurality of operating modes, each of the plurality of operating modes associated with a respective satellite system, by
      receiving satellite data associated with a first of the respective satellite systems,
      evaluating the satellite data, determining at least a portion of the satellite data is unsuitable for determining the position of the vehicle, and
      deactivating, prior to determining the position of the vehicle, an operating mode of the plurality of operating modes associated with the first of the respective satellite systems in response to the determination that the at least a portion of the satellite data is unsuitable for determining the position of the vehicle; and limiting an influence of the electronic control unit on at least one of the control operations of the vehicle when the operating mode has been deactivated, wherein limiting the influence includes limiting a speed of the vehicle.

8. The method of claim 7, further comprising:

deactivating a second operating mode of the plurality of operating modes associated with a second of the respective satellite systems when at least a portion of the further satellite data is unsuitable for determining the position of the vehicle of the GNSS sensor while the first operating mode is deactivated, and disabling an autonomous driving mode of the vehicle when the second operating mode is deactivated while the first operating mode is deactivated.

9. A vehicle comprising:

a GNSS sensor configured to operate in a plurality of operating modes, each of the plurality of operating modes associated with a respective satellite system; and an electronic control unit configured to
  influence control operations of the vehicle,
  receive satellite data associated with a first of the respective satellite systems,
  evaluate the satellite data,
  deactivate an operating mode of the plurality of operating modes when at least a portion of the satellite data is unsuitable for determining the position of the vehicle, and
  limit an influence of the electronic control unit on at least one of the control operations of the vehicle when the operating mode has been deactivated, wherein control operations of the vehicle are influenceable via the electronic control unit, and wherein limiting the influence includes limiting a speed of the vehicle.

10. The vehicle of claim 9, wherein:

the electronic control unit includes a computer program product; and the electronic control unit is configured to execute the computer program product to receive the satellite data, evaluate the satellite data, and deactivate the operating mode.

11. The vehicle of claim 10, wherein the computer program product is stored on a machine-readable storage medium.

12. The vehicle of claim 9, wherein the electronic control unit is further configured to:

receive further satellite data associated with a second of the respective satellite systems;

evaluate the further satellite data;

deactivate a second operating mode of the plurality of operating modes associated with a second of the respective satellite systems when at least a portion of the further satellite data is unsuitable for determining the position of the vehicle of the GNSS sensor while the first operating mode is deactivated, and disabling an autonomous driving mode of the vehicle when the second operating mode is deactivated while the first operating mode is deactivated.

* * * * *